(12) United States Patent
Palanki et al.

(10) Patent No.: US 8,885,550 B2
(45) Date of Patent: Nov. 11, 2014

(54) BEACON SYMBOL ORTHOGONALIZATION

(75) Inventors: Ravi Palanki, San Diego, CA (US);
Alexei Gorokhov, San Diego, CA (US);
Aamod Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1253 days.

(21) Appl. No.: 12/446,689

(22) PCT Filed: Oct. 26, 2007

(86) PCT No.: PCT/US2007/082751
§ 371 (c)(1),
(2), (4) Date: Apr. 22, 2009

(87) PCT Pub. No.: WO2008/052204
PCT Pub. Date: May 2, 2008

(65) Prior Publication Data
US 2010/0046447 A1 Feb. 25, 2010

Related U.S. Application Data

(60) Provisional application No. 60/863,122, filed on Oct. 26, 2006.

(51) Int. Cl.
*H04W 4/00* (2009.01)
*H04L 27/26* (2006.01)
*H04W 72/04* (2009.01)
*H04W 28/00* (2009.01)

(52) U.S. Cl.
CPC ............. *H04L 27/261* (2013.01); *H04W 28/00* (2013.01); *H04W 72/04* (2013.01)
USPC ........................................................ 370/328

(58) Field of Classification Search
CPC ...................................................... H04L 27/261
USPC .......................................................... 370/328
See application file for complete search history.

(56) References Cited

U.S. PATENT DOCUMENTS 5,940,765 A * 8/1999 Haartsen ....................... 455/462
6,351,463 B1 2/2002 DeSantis et al.
(Continued)

FOREIGN PATENT DOCUMENTS

CN 1235745 11/1999
EP 0684744 A2 11/1995
(Continued)

OTHER PUBLICATIONS

International Search Report—PCT/US2007/082751, International Search Authority—European Patent Office—Mar. 26, 2008.
(Continued)

*Primary Examiner* — Mark Rinehart
*Assistant Examiner* — Maharishi Khirodhar
(74) *Attorney, Agent, or Firm* — Stanton Braden

(57) ABSTRACT

Beacon symbols are sent periodically from the base stations in an OFDM system. The entire power of the base station, or a large portion of it is concentrated in these symbols, thus they are very easily recognized by the mobile stations. The frequencies upon which these symbols are transmitted and the time at which they are transmitted communicates information such as the base station/sector identity and the preferred carrier of the given base station/sector to the mobile station. In order to avoid collision between the beacon symbols of different base stations and sectors, the beacon symbols from different base stations/sectors are transmitted at different symbols times and on different subcarriers.

50 Claims, 12 Drawing Sheets

(56) References Cited

U.S. PATENT DOCUMENTS

2005/0068934 A1 * 3/2005 Sakoda ............... 370/350
2005/0210157 A1   9/2005 Sakoda

FOREIGN PATENT DOCUMENTS

| | | |
|---|---|---|
| GB | 2264842 A | 9/1993 |
| JP | 200580286 | 3/2005 |
| RU | 2154901 | 8/2000 |
| SU | 1626412 A1 | 2/1991 |
| TW | 200637253 | 10/2006 |
| TW | 365718 | 10/2009 |
| WO | 9809469 | 3/1998 |
| WO | 2004028048 | 4/2004 |
| WO | 2005109657 | 11/2005 |
| WO | 2005109917 | 11/2005 |
| WO | WO 2005/109917 A1 * | 11/2005 ............... H04Q 7/20 |
| WO | WO 2005109657 A1 * | 11/2005 |

OTHER PUBLICATIONS

Vishnevsky V M et al: "Beaconing in Distributed Control Wireless Pan: Problems and Solutions" Consumer Communications and Networking Conference, 2006. CCNC 2006. 2006 3rd IEEE Las Vegas, NV, USA Jan. 8-10, 2006, Piscataway, NJ, USA, IEEE, (Jan. 8, 2006), pp. 482-486, XP010893255.

Written Opinion—PCT/US07/082751, International Search Authority—European Patent Office—Mar. 26, 2008.

Taiwan Search Report—TW096140452—TIPO—Jun. 2, 2011.

* cited by examiner

BEACON SYMBOL ORTHOGONALIZATION

CROSS-REFERENCE TO RELATED APPLICATIONS

This application claims the benefit of U.S. Provisional Patent application Ser. No. 60/863,122 entitled "ORTHOGONALIZATION OF BEACONS IN A WIRELESS COMMUNICATION SYSTEM" which was filed Oct. 26, 2006. The entirety of the aforementioned application is herein incorporated by reference.

BACKGROUND

I. Field

The following description relates generally to wireless communications, and more particularly to orthogonalizing beacon symbols in a wireless communication system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. The antennae can relate to both base stations (e.g. access points) and mobile devices (e.g. access terminals) in one example, where the base station can provide communication channels to the mobile devices. Base stations can transmit beacon signals for interpretation by the mobile devices in an attempt to identify the base station and/or a transmission carrier or sector thereof. The beacon symbols are sent at a given time in a superframe thus giving way to beacon collision as the number of in-range sectors increases beyond a number of available subcarriers.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating time shifting of beacon symbols sent by base stations or sectors thereof. In particular, the beacon symbols can be sent in different symbol periods of a superframe and on different subcarriers to mitigate collision with beacon symbols from other sectors. In this way, the number of available independent channels for beacon symbol transmissions grows as a factor of the additional available symbol periods.

According to related aspects, a method of transmitting beacon symbols at different symbol periods is described herein. The method can comprise determining a symbol period for sending a beacon symbol to reduce or avoid collision with a second beacon symbol from a disparate source, the symbol period being determined from a subset of symbol periods useable for transmitting beacon symbols. The method can also comprise sending the beacon symbol in the determined symbol period.

Another aspect relates to a wireless communications apparatus. The wireless communications apparatus can include at least one processor configured to select at least one symbol period and/or a subcarrier in a superframe for transmitting a beacon symbol. The wireless communications apparatus can also include a memory coupled to the at least one processor.

Yet another aspect relates to a wireless communications apparatus that transmits one or more beacon symbols during different symbol periods of a superframe. The wireless communications apparatus can include means for dividing a superframe into one or more symbol periods and means for synchronously communicating within the symbol periods. The wireless communications apparatus can also include means for selecting one of the symbol periods for transmitting a beacon symbol to avoid collision with a second beacon symbol of another sector as well as means for transmitting the beacon symbol in the selected symbol period.

Still another aspect relates to a computer program product, which can have a computer-readable medium including code for causing at least one computer to determine a symbol period for sending a beacon symbol to reduce or avoid collision with a second beacon symbol from a disparate source, the symbol period being determined from a subset of symbol periods useable for transmitting beacon symbols. The code can also cause the at least one computer to send the beacon symbol in the determined symbol period.

In accordance with another aspect, an apparatus in a wireless communication system can include a processor configured to divide a superframe into one or more symbol periods, synchronously communicate within the symbol periods, select one of the symbol periods for transmitting a beacon symbol to avoid collision with a second beacon symbol of another sector, and transmit the beacon symbol in the selected symbol period. Also, the apparatus can include a memory coupled to the processor.

According to a further aspect, a method of receiving beacon symbols at multiple symbol periods is described herein. The method can comprise receiving beacon symbols from a plurality of transmitters, the beacon symbols being sent in a symbol period selected to reduce collision with the other transmitters. The method can additionally comprise decoding the received beacon symbols to obtain information comprised in the beacon symbol.

Another aspect relates to a wireless communications apparatus. The wireless communications apparatus can include at least one processor configured to receive and decode a plurality of beacon symbols sent from one or more sectors during different symbol periods in a synchronous wireless communications network. The wireless communications apparatus can also include a memory coupled to the at least one processor.

Yet another aspect relates to a wireless communication apparatus for receiving beacon symbols at multiple symbol periods. The apparatus can comprise means for synchronously communicating in a wireless communications network. The apparatus can also include means for receiving a first beacon symbol in a first symbol period in a superframe and means for receiving a second beacon symbol in a second symbol period of the superframe. The apparatus can further comprise means for decoding the first and second beacon symbols to identify one or more sectors transmitting the beacon symbols.

Still another aspect relates to a computer program product, which can have a computer-readable medium including code for causing at least one computer to receive beacon symbols from a plurality of transmitters, the beacon symbols being sent in a symbol period selected to reduce collision with the other transmitters. The code can also cause the at least one computer to decode the received beacon symbols to obtain information comprised in the beacon symbols.

In accordance with another aspect, an apparatus can be provided in a wireless communication system including a processor configured to synchronously communicate in a wireless communications network. The processor can also be configured to receive a first beacon symbol in a first symbol period in a superframe and receive a second beacon symbol in a second symbol period of the superframe. Moreover, the processor can also be configured to decode the first and second beacon symbols to identify one or more sectors transmitting the beacon symbols. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
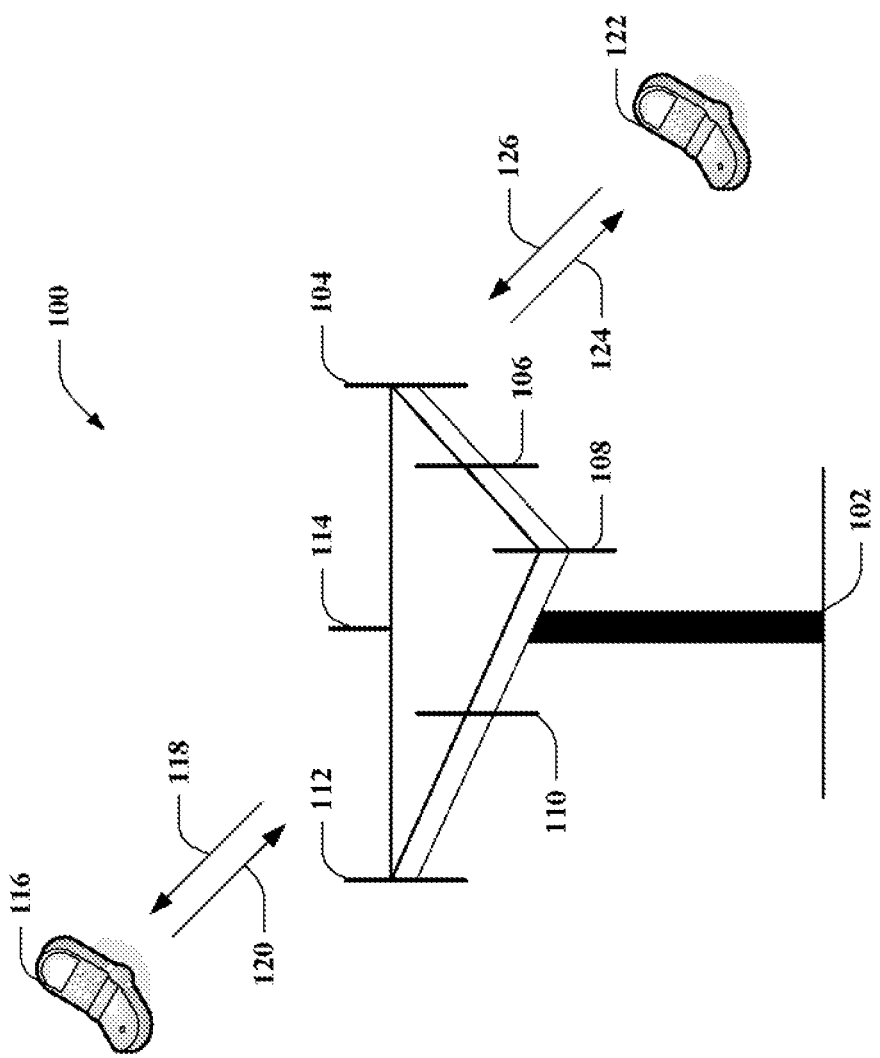
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additional include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

In one example, the base station 102 can send a beacon symbol from each antenna 104, 106, 108, 110, 112, and 114, and/or a grouping of antennae comprising information regarding the antenna and/or corresponding base station 102, such as identification information and/or other metrics or general information associated with the antennae and/or base station 102. According to an example, a beacon symbol can be a portion of a signal that is transmitted with substantial power to signal a small message to one or more mobile devices 116 and 122 that can have very low signal to noise ratios (due to distance or other interference, for example). The mobile devices 116 and 122 can receive one or more beacon symbols to discern information related to the antennae and/or base station 102; in one example, the beacon symbol can be one of the first signals the mobile devices 116 and 122 can interpret regarding a base station 102 or antenna. To this end, a beacon symbol can be sent so that it is easily identifiable by the mobile devices 116 and 122. According to an example, the base station 102 can send a beacon symbol from a given antenna 104, 106, 108, 110, 112, and/or 114 by transmitting substantially all available power on a single subcarrier channel thereof (or a small number of channels). The mobile devices 116 and/or 122 can receive the signal and perform a fast Fourier transform (FFT), or other decoding algorithm, on the signal to determine that one channel has a very high energy as compared to the others. The mobile devices 116 and/or 122 can conclude that this is a beacon symbol related to a given antenna and/or base station 102 and interpret the symbol accordingly.

To facilitate operability with a plurality of antennas (as shown in the figure) and/or a plurality of base stations (not shown), the base station 102 can time shift the beacon symbols to avoid collision and confusion. For example, one antenna 104 can transmit beacon symbols on a different timeslot from antenna 114 (or another antenna for another base station, for example). Additionally, the base station 102 can transmit the beacon symbols on different subcarriers of a bandwidth each time and/or according to a pattern of subcarriers and/or time slots. To this end, beacon symbols can also be a pattern of multiple symbols, each of which must be interpreted to obtain relevant information, as well. Moreover, in one example, the pattern or sequence can be comprised within one or more superframes (e.g. a frame of predetermined time duration).

While orthogonalization of beacons related to one or more antennas of a base station 102 can be implemented within the base station 102, the subject matter described herein additionally facilitates orthogonalizing beacons between different base stations and/or sectors thereof. The foregoing aspects can facilitate orthogonalization of many distinct combinations of beacon symbols even where a number of sectors available in an area exceed the number of subcarriers that exist for the available bandwidth. In this regard, the sectors can transmit associated beacon symbols while minimizing collision, for example. Additionally, by orthogonalizing beacon symbols, the base station 102 can devote substantially all power to beacon symbols for each antenna associated therewith. In one example, it is to be appreciated that other data can be sent (e.g. other OFDM symbols can be utilized) when sending a beacon symbol in a symbol period.

According to an example, system 100 can be a multiple-input multiple-output (MIMO) communication system. Further, system 100 can utilize any type of duplexing technique to divide communication channels (e.g., forward link, reverse link, . . . ) such as FDD, TDD, and the like. In one example, the system 100 can be an OFDMA system where symbols can be transmitted over a given frequency for a time period. Moreover, system 100 can be synchronous in one example, such that the base station 102, mobile devices 116 and 122, and/or other devices can have a time, clock, or other aspects to synchronize communications between the devices. This behavior, in one example, can facilitate time shifting of the beacon symbols, as described above, as the base station 102 can transmit the beacon symbols at given times and the mobile devices 116 and 122 can interpret the time sent and utilize that information to process subsequent beacon symbols or other transmissions. In one example, the base station 102 can transmit beacon symbols on determined symbol periods (and such can be communicated in a beacon symbol in one example) and the mobile devices 116 and 122 can utilize this information along with their own clock/timer to discern when a signal is a beacon symbol and/or when to expect such (e.g. in which superframe). In one example, a beacon can be transmitted according to a plurality of disparate beacon symbols (e.g. a beacon code) in one or more superframes. These can be time shifted within the superframe or about multiple superframes, and the code can be different at disparate points in time (such as within different superframes, etc.). Using information derived from the beacon symbols, a pattern of beacon symbols, and/or the timing of such, the mobile devices 116 and 122 can determine other information regarding the base station 102 and/or a broadcasting sector thereof. For example, the mobile devices 116 and 122 can come to recognize the beacon symbol of the base station 102, or a sector thereof, and determine the location of the superframe preamble for the base station 102 or sector. Other information, including the size of the superframe, identifying information, signal strength, signal quality, frequency, bandwidth capabilities, and substantially any information regarding the beacon, the base station 102, and/or the sector can be determined in part by the beacon symbol, for example.

Figure 2:
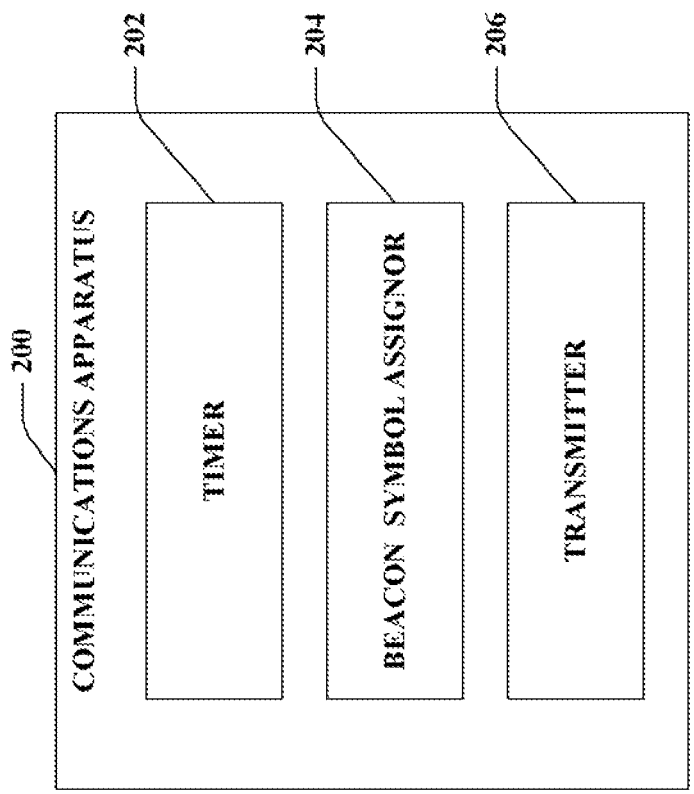
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that transmits one or more beacon symbols. The communications apparatus 200 can include a timer 202 that facilitates operating in a synchronized environment, a beacon symbol assignor 204 that selects a subcarrier in a bandwidth (and/or a time slot) for transmitting a beacon symbol (such as a beacon OFDM symbol), and a transmitter 206 that broadcasts the beacon symbol. In one example, the communications apparatus 200 can formulate a beacon symbol and assign it to a certain time slot in a superframe, for example, using the beacon symbol assignor 204. The beacon symbol can be broadcast using the transmitter 206 and leveraging the timer 202 to ensure the assigned time slot is used for the broadcast. It is to be appreciated that where the communications apparatus is a base station or other access point, it can have one or more transmitters 206, for example.

In one example, the timer 202 can keep a system time related to a wireless communication system to facilitate synchronized communicating therein. Devices communicating within the system can utilize the timer 202 to ensure accuracy of the time based communications. This allows communications apparatus 200 (or a plurality of such) to transmit beacon symbols in one or more symbol periods of a given superframe, for example. The beacon symbol assignor 204 can utilize the timer 202 to transmit the beacon symbol on a selected time slot or OFDM symbol. In this regard, other communications apparatuses receiving the beacon symbol can discern the time in the superframe and expect to receive a beacon symbol during that time or another time that can be indicated in the beacon symbol, handling such accordingly. To this end, the beacon symbol assignor 204 can select a specific subcarrier for transmission of one or more beacon symbols; for example, the subcarrier can be assigned per an antenna to which the beacon symbol relates. According to an example, the selection of the subcarrier can be based on network planning such that communications apparatuses situated near to one another (where the signals transmitted could be received by a single device) can select disparate subcarriers for the beacon symbols to allow a receiving device to distinguish the apparatuses. It is to be appreciated, however, that different subcarriers can be used by a single communications apparatus for transmission of a beacon symbol in different time slots or superframes and/or a pattern of subcarriers can be used as well.

According to another example, the beacon symbols transmitted by the communications apparatus 200 can be time shifted as well to prevent collision with other signals sent by the communications apparatus 200 or other communications apparatuses (including mobile devices, access points, etc. as mentioned above). This can be inherently useful as it provides flexibility in the communications system as well as useful where a number of sectors that overlap for a given area can be greater than subcarriers available in a bandwidth used to communicate by the sectors, for example. According to one example, neighboring communications apparatuses (or apparatuses with overlapping coverage areas) can be assigned different time slots and/or different subcarriers for transmitting beacon symbols. To this end, the beacon symbol assignor 204 of each communications apparatus 200 can ensure the correct time slot and/or subcarrier (and/or tone) is selected by leveraging the timer 202 to determine time. The transmitter 206 can transmit the beacon symbol at the appropriate time.

As described, the beacon symbol assignor 204 can assign disparate time slots and/or subcarriers to different communications apparatuses to mitigate collision and confusion in beacon symbol transmission. The time slot and/or subcarrier can be assigned during network planning, in one example, such that neighboring sectors can transmit beacons on different time slots and/or subcarriers without colliding. In another example, the time slots and/or subcarriers can be assigned similarly to assignment of carriers to sectors (e.g. frequency reuse). In a further example, the time slots and/or subcarriers can be assigned randomly and/or pseudo-randomly (e.g. such that only a given number of periods in a superframe or subcarriers can be used for beacon symbols or for beacon symbols for that given communications apparatus). In this regard, for example, a subset of periods in the superframe and/or a subset of subcarriers can be selected for randomization for a given communications apparatus 200, and other communications apparatuses in range of the communications apparatus 200 can be assigned a different subset of symbol periods and/or subcarriers to randomize to further mitigate the chance of collision. Moreover, time slots and/or subcarriers can be assigned from a device within a network to which the communications apparatus 200 relates (e.g. based on an identifier, model, antenna grouping, range, surrounding communications apparatuses, and/or other metric associated with the communications apparatus 200). In addition, time slots and/or subcarriers can be assigned in real-time by a device that can communicate with the beacon symbol assignor 204, such as the network device. Further, the time slot and subcarrier information can be pulled by the communications apparatus 200 from another device or apparatus and/or determined using inference technology regarding neighboring sectors. In one embodiment, the information regarding the neighboring sectors can be received by a mobile device moving about the sectors, a network that connects or utilizes the sectors, directly from the sectors, and/or the like. In this example, the communications apparatus 200 can report back (and/or negotiate) its beacon time slot(s) and/or subcarrier(s). It is to be appreciated that the time slots can be assigned using one or more of the aforementioned aspects, and the subcarriers can be assigned using the same or a different aspect.

However determined, the beacon symbol assignor 204 can leverage the timer 202 and transmitter 206 to ensure the beacon symbol, or symbols, is/are properly transmitted. As mentioned, the beacon symbol assignor 204 can assign the time slots and subcarriers in substantially any available combination. For example, the beacon symbol assignor 204 can assign one beacon symbol to one subcarrier of one time slot or period in a superframe for communications apparatus 200. The subcarriers and/or periods used can be different for other beacon symbols from other communications apparatuses, for example. According to another example, the communications apparatus 200 can be assigned (or can request, for example) a plurality of time slots and/or subcarriers to be used in sending a beacon. In this example, the beacon can be a pattern of beacon symbols (e.g. a beacon code) where the symbols are received in totality by a device reading the broadcast to interpret the beacon symbol. It is to be appreciated that, in this example, by using multiple time slots in a superframe, the time needed for a device to interpret a beacon code can be lessened as the entire, or at least more than one symbol in the code, can be transmitted in a single superframe.

As described previously, the communications apparatus 200 can have multiple transmitters 206, where each transmitter 206 can send a disparate beacon. In this regard, the communications apparatus 200 can time shift the beacon symbols and transmit the beacons on disparate subcarriers of bandwidth. In this regard, substantially all the power of the communications apparatus 200 can be used to transmit the beacon symbols as substantially no other subcarriers are used for the time slot. It is to be appreciated that a small number of subcarriers can be used as well, but other transmissions can be pushed to the next non-beacon time slot. Alternatively, the beacons can transmit on disparate subcarriers in the same time slot or period, in which case the power of the communications apparatus 200 can be split among the transmitters 206 for broadcasting beacons.

Moreover, although not shown, it is to be appreciated that communications apparatus 200 can include memory that retains instructions with respect to assigning a beacon symbol time slot and/or subcarrier based on the aforementioned determinations and in at least one of the aforementioned configurations. Further, communications apparatus 200 can include a processor that can be utilized in connection with executing instructions (e.g., instructions retained within memory, instructions obtained from a disparate source, . . . ).

Figure 3:
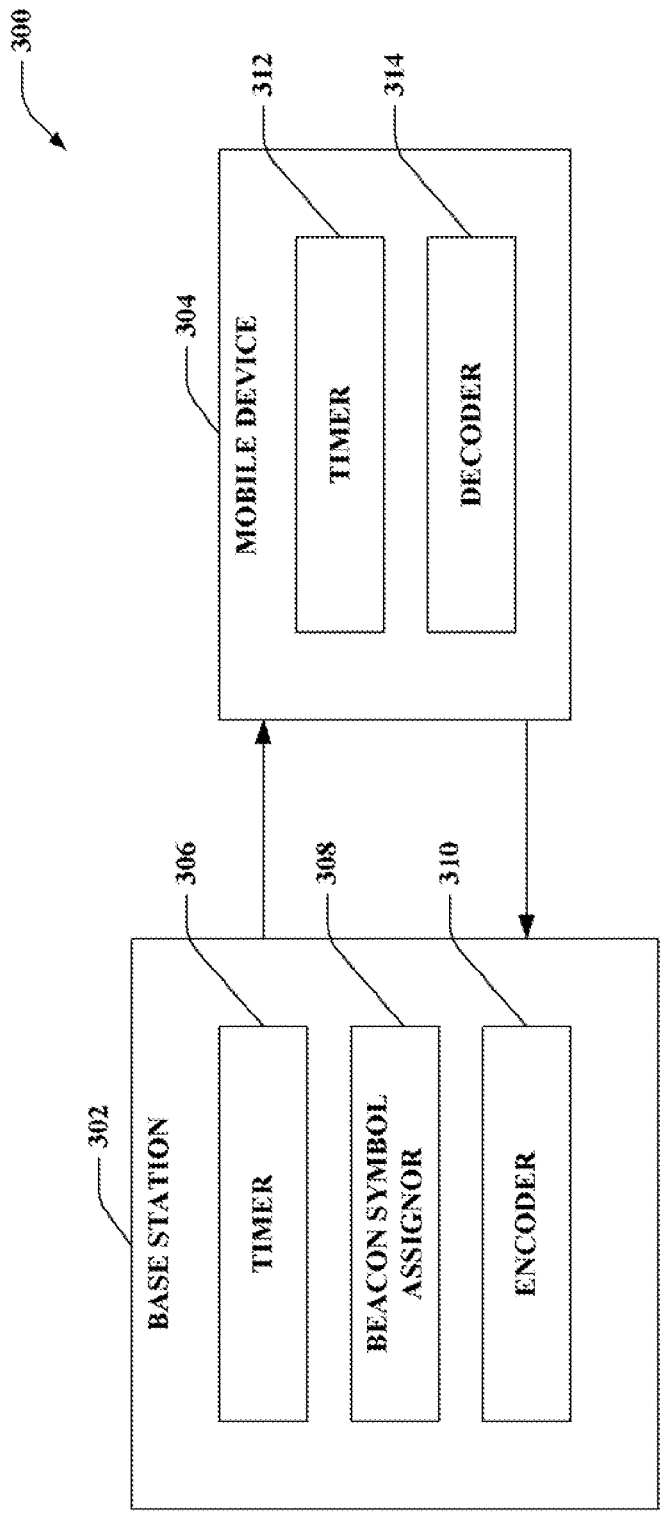
FIG. 3 is an illustration of an example wireless communications system that effectuates transmitting beacon symbols on different symbol periods.

Now referring to FIG. 3, illustrated is a wireless communications system 300 that effectuates orthogonal transmission of beacon symbols. System 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, in one example.

Base station 302 can include a timer 306 that is synchronized throughout the system 300 to facilitate synchronized communication, a beacon symbol assignor 308 that assigns a beacon and/or a plurality of symbols related thereto to one or more time slots of a superframe and/or subcarriers of bandwidth, and an encoder 310 that transforms the communication into a time domain, such as by using an inverse fast Fourier transform (IFFT), for example. Additionally or alternatively, the encoder 310 can convert a sector identifier to a beacon code (e.g. a pattern of beacon symbols), for instance. In one example, the beacon symbol assignor 308 can select a subcarrier for transmission of the beacon symbol, and the encoder 310 can transform the beacon symbol into a sector identifier and/or to a time domain. The beacon symbol assignor 308 can select a time slot for transmitting the beacon symbol as described supra, and the base station 300 can leverage the timer 306 to transmit the beacon symbol during the appropriate time. In this regard, the system 300 can allow synchronous communication between the base station 302 and the mobile device 304.

The mobile device 304 can comprise a timer 312 that facilitates synchronous communication in a wireless communication network, for example, and a decoder 314 that decodes messages received from other network entities. According to one example, the mobile device 304 can receive a beacon symbol (or other data transmission) and decode it using the decoder 314. The decoder 314 can also determine a sector based in part on a beacon symbol or plurality of such forming a pattern/beacon code, for example. Additionally, the mobile device 304 can leverage its timer 312 to determine additional information regarding the transmission. For example, beacon symbols can be sent at certain given time slots in which case the mobile device 304 can discern whether a transmission is a beacon symbol or not based on the time slot determined by the timer 312.

According to an example, the encoder 310 can create a beacon code (e.g. a sequence of beacon symbols) related to a sector identifier of the base station 302. The beacon symbol assignor 308 can assign one or more subcarriers on one or more time slots for transmitting a portion of the beacon code. Additionally, the encoder 310 can transform the beacon code, or a portion thereof (such as the transmitted portion) to a time domain (e.g. such as by performing an IFFT). Utilizing the timer 306, the base station 302 can broadcast the beacon according to the beacon code. The mobile device 304 can receive the broadcast and utilize the decoder 314 to perform an FFT on the broadcast to transform the symbols of the bandwidth to the frequency domain. This will yield one symbol, or a small number of symbols, with substantially more energy than the others indicating a beacon symbol. The timer 312 can be utilized to discern a receive time for the beacon symbol. Using additional information in the beacon, the mobile device 304 can identify a sector to which the beacon belongs, for example; this information can also be discerned by the decoder 314 in an example. Where the beacon is a code of symbols disparately broadcast, the mobile device 304 can decode the plurality of symbols as they arrive and utilize the timer 312 to discern timing of the beacon symbols. Using this information, the mobile device 304 can identify the source of the beacon and/or other information regarding the source. Additionally, the mobile device 304 can identify the location of a related superframe preamble for use with subsequent beacon and non-beacon transmissions from the base station 302 or sector, for instance. In this regard, the mobile device 304 can comprise valid beacon symbols or beacon codes that can be recognized by the mobile device 304 (these can be stored in a memory, for example).

Figure 4:
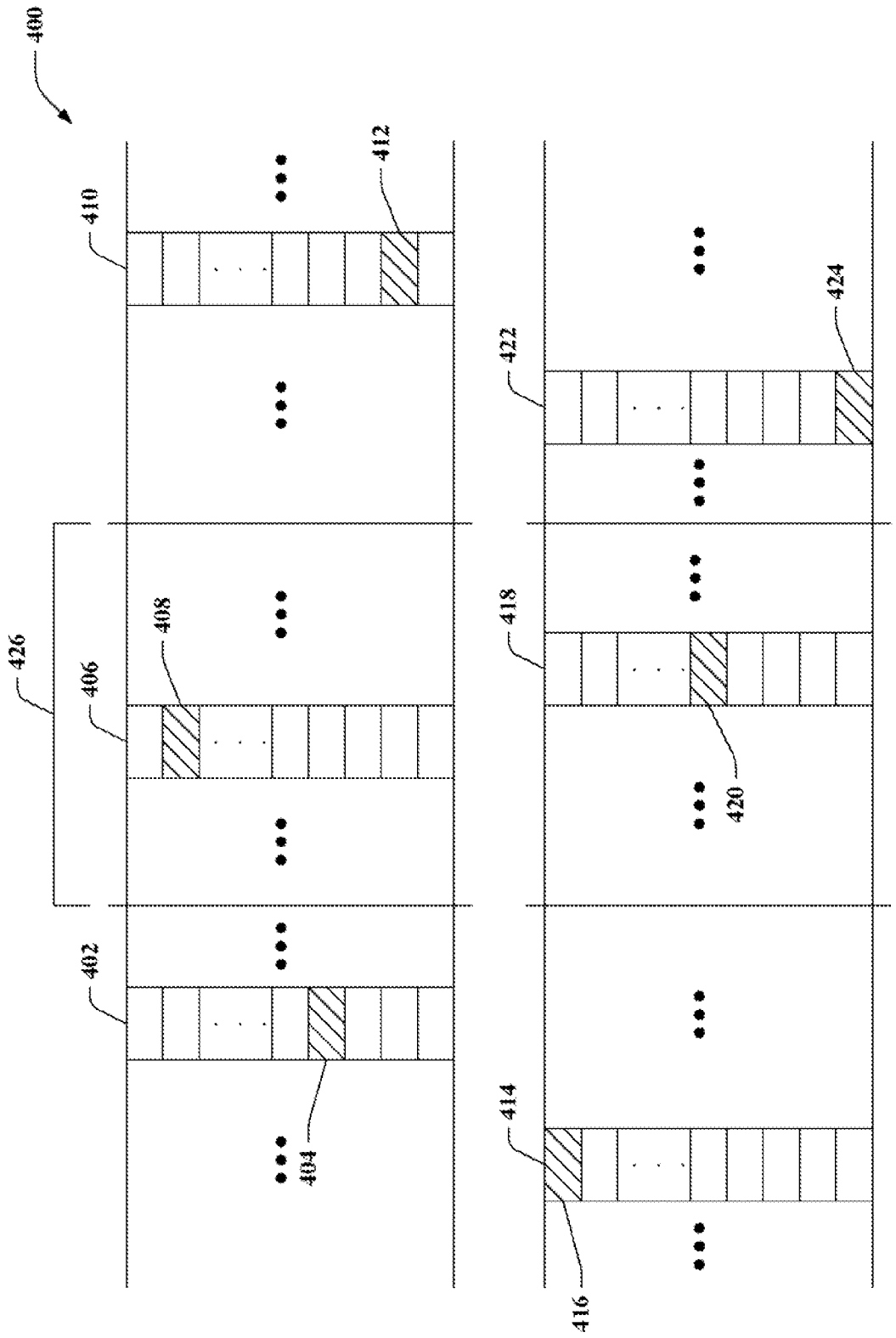
FIG. 4 is an illustration of example superframes and symbol periods utilized in wireless communications systems.

Now referring to FIG. 4, a representation of two bandwidths over a period of time 400 is displayed for two disparate transmitters. The bandwidth is represented by a plurality of subcarriers for given symbol periods 402, 406, 410, 414, 418, and 422 and the time period can be separated into one or more superframes 426, which can have predetermined time durations for example. Each of the shown symbol periods 402, 406, 410, 414, 418, and 422 can broadcast beacon symbols 404, 408, 412, 416, 420, and 424, respectively, represented as substantially the only subcarrier in the symbol period utilizing power (which can be substantially all the power that is available since the other subcarriers are not powered). As shown, the beacon symbol 404, 408, and/or 412 can be transmitted on different subcarriers and/or at different time periods each superframe. Moreover, the beacon symbols for the second transmitter 416, 420, and 424 can be broadcast at different symbol periods to disambiguate the symbols from those of the first transmitter. In one example, though not shown, the transmitters can use substantially the same beacon code (e.g. plurality of beacon symbols in sequence). In this example, transmitting the symbols at different symbol periods can mitigate confusion between the two transmitters sending substantially the same beacon code, for example. It is to be appreciated that multiple beacon symbols can be transmitted per superframe; also, one or more superframes can be skipped and not transmit a beacon symbol as well.

According to an example, the beacon symbols 404, 408, and 412 can relate to the same or different sectors for a given base station, one or more carriers for a single sector, and/or the like. Additionally, beacon symbols 416, 420, and 424 can relate to a disparate sector and/or transmitter/carrier within a given base station or a different base station all together, for example. In this regard, the beacon symbols 404, 408, and 412 can be chosen based on an identifier of the base station or sector (e.g., sector ID, etc.). For instance, the base station can have a plurality of transmitters that facilitate communication in a plurality of sectors, and a beacon symbol is sent for each sector in a different subcarrier, time period, and/or superframe. In another example, a sector can have a number of carriers that can send beacon symbols as well. Thus, the beacon symbol 404 can relate to a sector or carrier, 408 to another, 412 to another, and so on. In one example, the beacon symbols can be transmitted within one or more superframes using multiple OFDM symbols within the superframes, though not shown in this figure. Additionally, the same or different subcarriers can be used for each transmission for a given sector; the subcarriers can be rotated between the sectors in one example as well. Also, the time slots can be the same or different in each superframe or sequence of superframes for the given sectors, for example. According to another example, transmissions can be sent by the base stations in the time periods, and punctured when a beacon symbol needs to be transmitted.

In another example, the beacon symbols 404, 408, and 412, can relate to a single sector of a base station that transmits a beacon in each of the three displayed superframes or transmits the multiple beacon symbols as a portion of a beacon code as described previously. In this regard, the beacon symbols 416, 420, and 424 can relate to another beacon code. In one example, at least one of the beacon symbols 404, 408, and/or 412 (as well as 416, 420, and/or 424) can provide information regarding the timing and/or subcarriers used in transmitting subsequent symbols in the beacon code. It is to be appreciated that more than one base station can provide a substantially similar code; to mitigate confusion, the codes can be offset according to timeslot/symbol period of a superframe as described herein such that the symbols are not received at competing times by devices in the transmission area of the one or more base stations. Although not shown, the two beacons (or more beacons) can overlap with respect to some symbols (e.g., beacon symbols of disparate sectors can overlap). Moreover, though not shown, multiple beacon symbols related to a beacon (e.g., of a sector, base station, mobile device, etc.) can be chosen to transmit in a single superframe as well.

In one example, a superframe 426 can have 256 usable subcarriers (e.g. OFDM symbols), such as that shown at 408, for a given symbol period, such as 406. Additionally, 512 sectors (or another number greater than 256) can transmit in a given area; in this example, using time shifts along with the 256 subcarriers to transmit beacon symbols can facilitate transmitting beacon symbols for all sectors without conflict. To this end, the sectors can utilize a time shifting configuration as described previously, including network planning before or during base station deployment, communications between the sectors regarding claimed or assigned time slots, information received from other devices, such as mobile devices, regarding beacon slots of other sectors, information about the sectors themselves, such as an identifier, and the like, for example.

Figure 5:
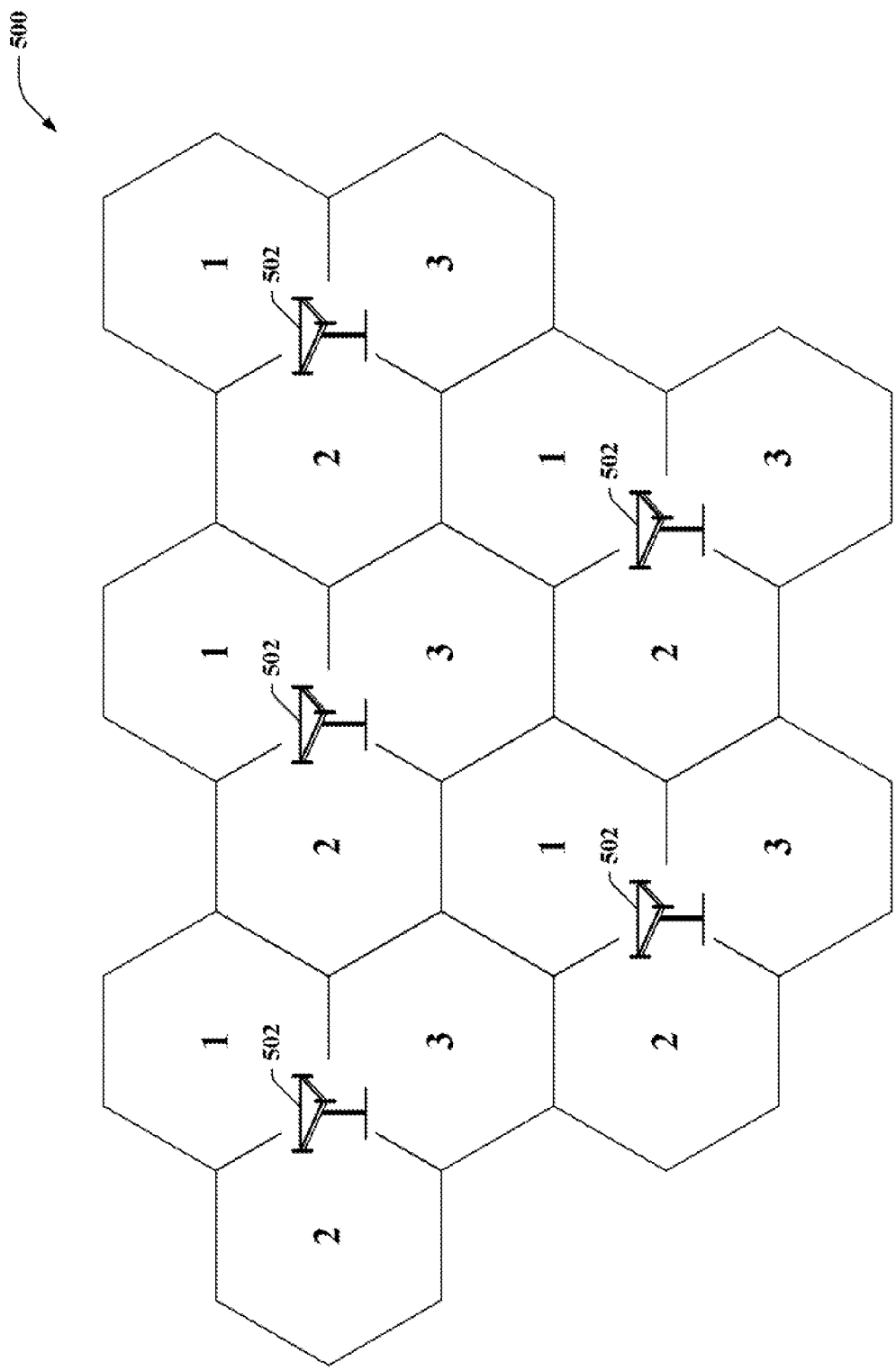
FIG. 5 is an illustration of an example wireless communications network.

Turning now to FIG. 5, a multi-cell layout 500 in a wireless communication network is shown. The network can comprise a plurality of base stations 502 having one or more transmission carriers or sectors; for example, as shown each base station can have 3 sectors, each of which can be assigned a specific carrier. In this figure, the adjacent sectors are shown using different carriers to mitigate interference within the sectors, for example. This can be referred to as frequency reuse having a factor of 3, for instance. In this regard, a carrier can be referred to as a range of frequencies used by a sector to transmit a waveform.

Beacon symbols in such a network configuration can be transmitted with or without reusing frequencies; for example, one carrier of the base station 502 can transmit a beacon symbol, or more than one carrier can transmit such. Additionally, data transmission can utilize such configurations as well creating some possible combinations of beacon and data use of carriers. In one example, both data and beacon symbols can be transmitted on a single carrier. This can reduce overhead for the beacon symbols as a preferred carrier can be used for both beacons and data. In another example, the beacon symbols can transmit on more than one carrier with the data on a single carrier. This configuration can allow mobile devices to detect beacons on the different carriers without interrupting current communications on a data carrier. Additionally, greater power can be given to the beacon symbol (e.g. facilitating pilot detection by out-of-band devices), in one example, as the data transmissions are not interrupted to allow transmission of the beacon. It is to be appreciated that other configurations are possible as well, such as the converse of the aforementioned configuration as well as having data and beacons use more than one of the available sectors for transmission.

As described previously, beacon symbols can be sent utilizing the same or different subcarriers and/or the same or different symbol periods and/or time slots (e.g. per superframe). The beacon symbol can comprise information regarding a sector identifier and/or another type of identifier (such as a pseudo-random number, a group identifier, one or more sector or carrier identifiers, preferred carrier index, and the like), for example. In one example, the beacon for a given sector or carrier can comprise one or more beacon symbols formulating a beacon code or pattern. Substantially any code can be used for the beacon where zero to many beacon symbols can be transmitted per superframe for a given number of superframes. One such code can entail using a maximum distance separable (MDS) code to transmit beacon symbols forming a beacon. The MDS code can be formulated, in one example, by evaluating at least one of the length of the beacon message (e.g. in bits), the number of subcarriers available to transmit the beacon, the amount of redundancy desired for the beacon message, the length of the sequence of non-binary symbols, and/or additional similar factors.

According to an example, 256 subcarriers can be available for transmitting a beacon from a base station 502 where the beacon can be a 12-bit message (including data as described previously); thus, because a sector can transmit non-binary symbols, the MDS code can be required to support at least $2^{12}=4096$ different sequences of non-binary symbols. In one example, the beacon symbols can be transmitted at different times denoted by the index t, where $0 \leq t < \infty$. For these symbols, the beacon can be transmitted on a subcarrier with an index $X_t(\alpha_1, \alpha_2)$, which can be expressed as:

$$X_t(\alpha_1,\alpha_2) = p_1^{\alpha_1+16t} \oplus p_2^{\alpha_2+\alpha_1+16t},$$

where $p_1$ and $p_2$ can be primitive elements of field $Z_{257}$ (which can comprise 257 elements representing the subcarriers), $\alpha_1$ and $\alpha_2$ can be exponent factors determined based at least in part on the beacon message (as described infra), and $\oplus$ denotes modulo addition. In this example, $p_1$ and $p_2$ can represent elements of $Z_{257}$ that can generate all 256 non-zero elements of the field. In a more trivial example, $Z_{257}$ can have 5 as a primitive element as 5 can used to generate all 6 non-zero elements ($5^0$ mod $7=1$, $5^1$ mod $7=5$, $5^2$ mod $7=4$, $5^3$ mod $7=6$, $5^4$ mod $7=2$, and $5^5$ mod $7=3$). Additionally, the exponent factors $\alpha_1$ and $\alpha_2$ can be defined as:

$0 \leq \alpha_1 < 16$ $0 \leq \alpha_2 < 256.$

Thus, a total of $16*256=4096$ disparate combinations of $\alpha_1$ and $\alpha_2$ can be defined by the equation; this can support the 12-bit message having 4096 available sequences, for example. Additionally, each unique combination of $\alpha_1$ and $\alpha_2$ can correspond to a different message (and thus a different sequence of non-binary symbols for the beacon) in this regard. In an example, a message can be mapped to the available symbols in substantially any manner including randomly, static assignment via network planning or configuration, historical based, and the like. According to one example, for a given combination of $\alpha_1$ and $\alpha_2$, the message, M, can be mapped to $M=256*\alpha_1+\alpha_2$, for example. Because $p_i^{256}=1$, for $i=1, 2$, the code of the aforementioned equation can be periodic with a period of $256/16=16$ symbols; thus, $X(\alpha_1, \alpha_2)=X_{t+16}(\alpha_1, \alpha_2)$ for a given value of t, in one example. The beacon symbols can be shifted according to time and subcarrier in this way.

According to another example using a Reed-Solomon code, 211 subcarriers can be available for transmitting beacon symbols (e.g. n=211 at 402) where the beacon symbol can be a 12-bit message (including data as described previously); thus, the Reed-Solomon code can be required to support at least $2^{12}=4096$ different sequences of non-binary symbols (which is what the sector transmits, for instance). According to this example, the beacon symbols can be transmitted on a subcarrier with an index $X_t(\alpha_1, \alpha_2)$, which can be expressed as:

$$X_t(\alpha_1,\alpha_2) = p_1^{\alpha_1+2t} \oplus p_1^{\alpha_2} p_2^{2t},$$

where $p_1$ can be a primitive element of field $Z_{211}$ (which can comprise 211 elements representing the subcarriers) and $p_2=p_1^2$, $\alpha_1$ and $\alpha_2$ can be exponent factors determined based at least in part on the beacon message (as described infra), and $\oplus$ denotes modulo addition. In this example, $p_1=207$ and $p_2=p_1^2=16$. Other primitive elements can be used for $p_1$ in other examples. A larger primitive element can provide more frequency diversity since a small value of $p_1$ can imply that $p_1^{q\square t}$ and $p_1^{q\square(t+1)}$ are close together. The selection of $p_2=p_1^2$ can result in the Reed-Solomon code, which can be characterized by a weighted sum of increasing exponentials.

The exponent factors $\alpha_1$ and $\alpha_2$ can be defined as:

$0 \leq \alpha_1 < 21$, and $0 \leq \alpha_2 < 210.$

Thus, a total of $21*210=4410$ disparate combinations of $\alpha_1$ and $\alpha_2$ can be defined by the equation; this can support the 12-bit message having 4096 available sequences, for example. Additionally, each unique combination of $\alpha_1$ and $\alpha_2$ can correspond to a different message (and thus a different sequence of non-binary symbols for the beacon) in this regard. In an example, a message can be mapped to the available symbols in substantially any manner including randomly, static assignment via network planning or configuration, historical based, and the like. According to one example, for a given combination of $\alpha_1$ and $\alpha_2$, the message, M, can be mapped to $M=210*\alpha_1+\alpha_2$, for example. Because $p_i^{210}=1$, for $i=1, 2$, the code of the aforementioned equation can be periodic with a period of $210/21=10$ symbols; thus, $X(\alpha_1, \alpha_2)=X_{t+10}(\alpha_1, \alpha_2)$ for a given value of t, in one example. The beacon symbols can be shifted according to subcarrier in this way to convey information to a receiver, for example.

According to yet another example for transmitting a beacon code, 47 subcarriers can be used to facilitate communicating between base stations 502 and devices within range of one or more sectors. In this regard, subcarriers 0-46 can be utilized to send beacon symbols (as well as other data); as in the previous example, a 12-bit beacon code, for example, can require support of 4096 different sequences. To facilitate such, the beacon symbol can be transmitted on a subcarrier with index $X_t(\alpha_1, \alpha_2, \alpha_3)$, which can be expressed as:

$$X_t(\alpha_1,\alpha_2,\alpha_3) = p_1^{\alpha_1+2t} \oplus p_2^{\alpha_2+\alpha_1+2t} \oplus p_3^{\alpha_3+\alpha_1+2t},$$

where $p_1$ and $p_2$ can be primitive elements of field $Z_{47}$ (which can comprise 47 elements representing the subcarriers), $\alpha_1$, $\alpha_2$, and $\alpha_3$ can be exponent factors determined based at least in part on the beacon message (as described infra), and $\oplus$ denotes modulo addition. In this example, the exponent factors $\alpha_1$, $\alpha_2$, and $\alpha_3$ can be defined as:

$0 \leq \alpha_1 < 2,$ $0 \leq \alpha_2 < 46$, and $0 \leq \alpha_3 < 46.$

Thus, a total of $2*46*46=4232$ disparate combinations of $\alpha_1$, $\alpha_2$, and $\alpha_3$ can be defined by the equation, thus, supporting the required 4096 combinations for the beacon symbol. The beacon message can be mapped to a combination in one example as $M=2116*\alpha_1+46*\alpha_2+\alpha_3$. Additional and/or alternative mappings can be used as well as described supra. Because $p_i^{46}=1$, for $i=1, 2, 3$, the code can be periodic with a period of $46/2=23$ symbols, for example; thus, $X_t(\alpha_1, \alpha_2, \alpha_3)=X_{t+23}(\alpha_1, \alpha_2, \alpha_3)$ for a given t.

Another example using an MDS code, which will be referred to hereinafter as "beacon code B'," can be a Reed-Solomon code designed using 47 subcarriers to transmit beacon symbols (e.g. n=47 in the subcarriers for symbol period 402). As in the previous example, a 12-bit beacon code, for example, can require support of 4096 different sequences. To facilitate such, the beacon symbol can be transmitted on a subcarrier with index $X_t(\alpha_1, \alpha_2, \alpha_3)$, which can be expressed as:

$$X_t(\alpha_1,\alpha_2,\alpha_3) = p_1^{\alpha_1+2t} \oplus p_1^{\alpha_2} p_2^{2t} \oplus p_1^{\alpha_3} p_3^{2t},$$

where $p_1$ can be a primitive element of field $Z_{47}$ (which can comprise 47 elements representing the subcarriers), $p_2=p_1^2$, $p_3=p_1^3$, and $\alpha_1$, $\alpha_2$, and $\alpha_3$ can be exponent factors determined based at least in part on the beacon message (as described herein). In this example, arithmetic operations can be over the field $Z_{47}$, and in one example, $p_1=45$, $p_2=p_1^2=4$, and $p_3=p_1^3=39$; other primitive elements can be used for $p_1$ as well. The selection $p_2=p_1^2$ and $p_3=p_1^3$ results in a Reed-Solomon code in the above equation, for example. Additionally, $\alpha_1$, $\alpha_2$, and $\alpha_3$ can be defined as:

$$0 \leq \alpha_1 < 2,$$

$$0 \leq \alpha_2 < 46, \text{ and}$$

$$0 \leq \alpha_3 < 46.$$

More than 4096 disparate combinations of $\alpha_1$, $\alpha_2$, and $\alpha_3$ can be defined by the equation. Because $p_i^{46}=1$, for i=1, 2, 3, the code can be periodic with a period of 46/2=23 symbols, for example; thus, $X_t(\alpha_1, \alpha_2, \alpha_3)=X_{t+23}(\alpha_1, \alpha_2, \alpha_3)$ for a given t.

It is to be appreciated that the subject matter as described herein is not so limited to the foregoing examples presented. Rather, the examples are two of substantially any number of implementations and are presented herein to facilitate discussion. Other schemes can be utilized as well, such as for example a purged MDS code designed such that a terminal or device can decode a beacon based only on one beacon symbol. It is to be appreciated that beacon codes can be selected according to many factors, such as those mentioned herein including network planning, derived information regarding other sectors or beacons, as well as, based on beacon message length, number of available carriers, desired performance (e.g. signal-to-noise ratio).

Figure 6:
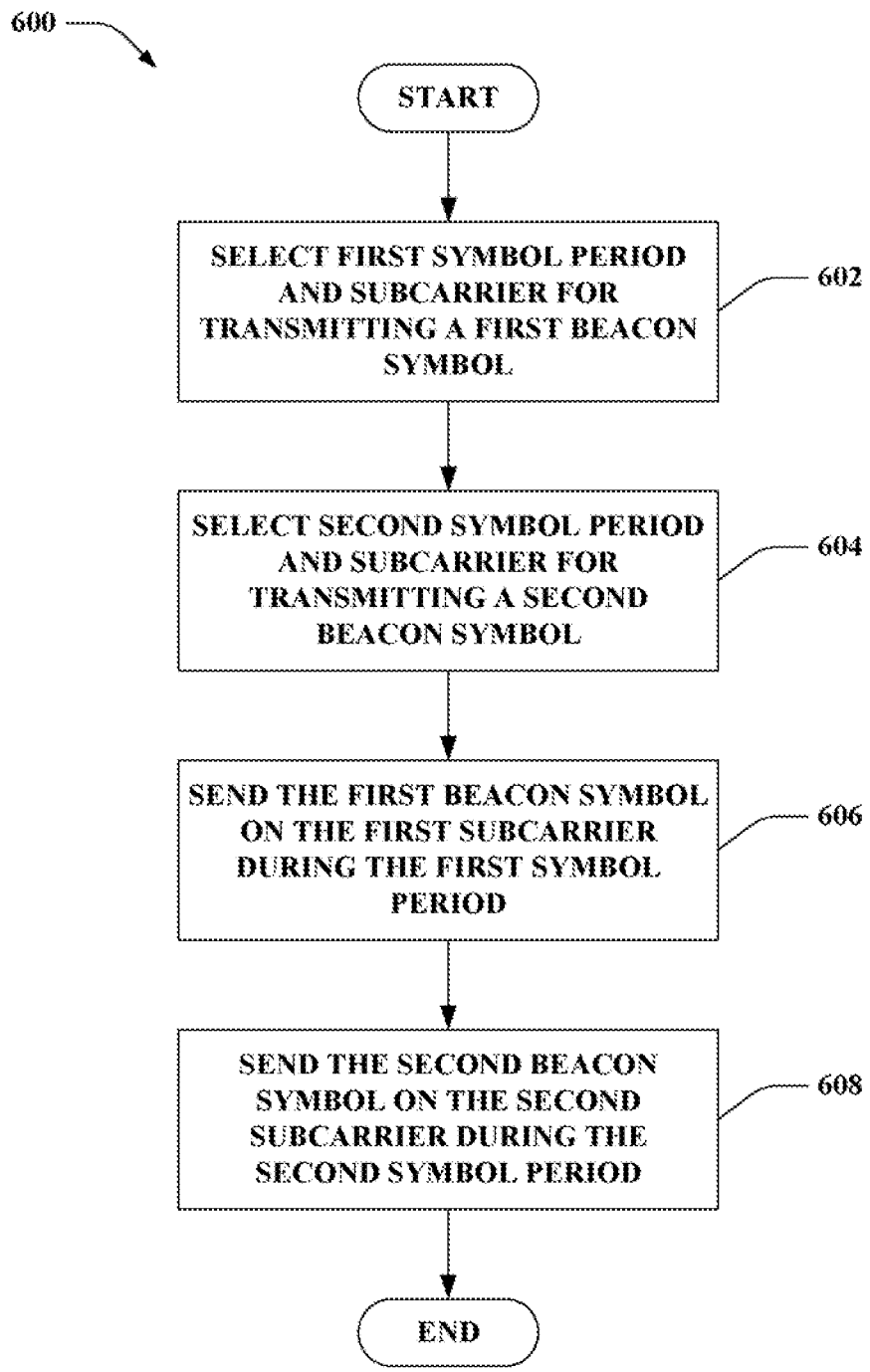
FIG. 6 is an illustration of an example methodology that facilitates transmitting beacon symbols at different symbol periods.
Figure 7:
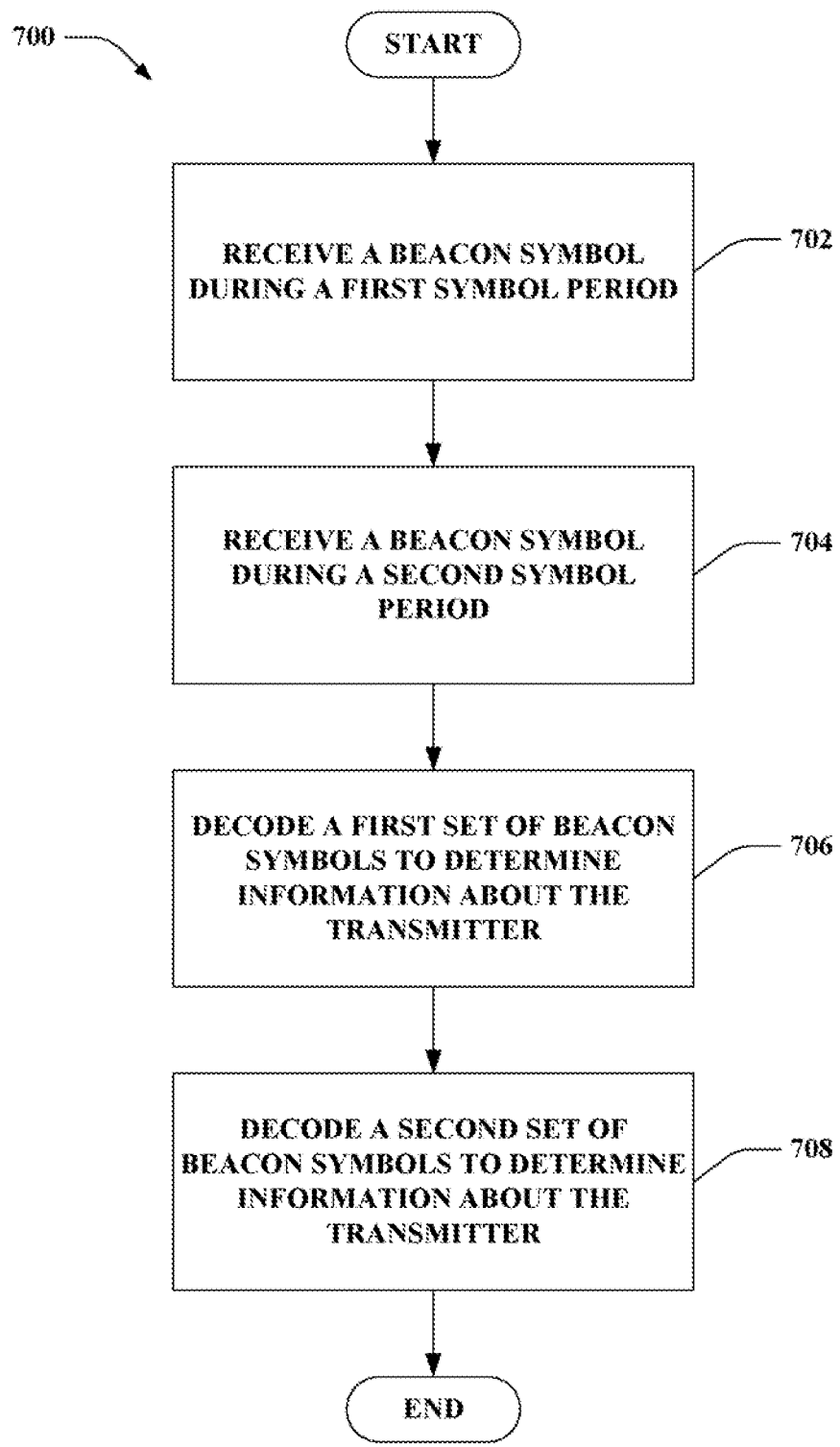
FIG. 7 is an illustration of an example methodology that facilitates receiving beacon symbols transmitted in different symbol periods.

Referring to FIGS. 6-7, methodologies relating to broadcasting beacons or symbols thereof on a plurality of subcarriers and symbol periods are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates transmitting multiple beacon symbols on disparate symbol periods or time slots using the same or different subcarriers to facilitate avoiding beacon symbol collision between sectors. At 602, a first symbol period and subcarrier are selected for transmitting a first beacon symbol. It is to be appreciated that the beacon symbol can comprise information regarding the sender of the symbol, such as an identifier or other communication data. The beacon symbol, in one example, can be transmitted utilizing substantially all available power for the subcarrier at the given symbol period. To avoid collision, a second symbol period and subcarrier can be selected for transmitting a second beacon symbol at 604. The subcarrier can be the same as utilized for the first beacon symbol or a different subcarrier in available bandwidth. It is to be appreciated that the same or different transmitters can be utilized to send the beacon symbols; the scheme of selecting different times at which to send the symbols can avoid collisions of the beacon symbols with respect to a receiving device, for example. The symbol periods and/or subcarriers can be selected according to many different schemes, such as those described previously, including but not limited to network planning, information obtained regarding other transmitters (whether from the transmitter or devices roaming about), inferences made from other acquired information about transmitters, such as a manufacturer and/or bandwidth used, etc.

At 606, the first beacon symbol can be sent during the first time slot or symbol period and on the first subcarrier. For example, this can be a symbol period of a superframe in an OFDM configuration; the beacon symbol can be substantially the only transmission occurring during the symbol period in one example. At 608, the second beacon symbol is sent during the second symbol period on the subcarrier. The second symbol period can be in the same or a different superframe, for example; also, the second subcarrier can be the same or different than the first subcarrier. In one example, the first and second beacon symbols can be transmitted from different areas; however, the beacon symbols can also be part of a beacon code or pattern transmitted for one area. Accordingly, the beacon can be decoded in its entirety by decoding the separate beacon symbols in one example. Moreover, according to one example, the beacon symbols can be sent according to a timer in a synchronous communications environment.

Now referring to FIG. 7, a methodology 700 that facilitates receiving a plurality of beacon symbols of different symbol periods and subcarriers is illustrated. At 702, a first beacon symbol is received during a first symbol period. This can be a symbol period of a given superframe in an OFDM wireless communication network, for example, and can be received on a single, or a small number of, subcarrier(s) in the bandwidth. The subcarriers can transmit symbols to facilitate communication. In one example, the beacon symbol can be particularly strong as it can be the only symbol transmitted in a given period from a transmitter. Though the receiving entity can receive other symbols from other transmitters, in one embodiment, the beacon symbol can be easily identified as it can be the only symbol used in the carrier. At 704, a second beacon symbol is received in a second symbol period. It is to be appreciated that this symbol can be transmitted on the same or a different subcarrier; additionally, the beacon symbol can be sent by the same or a different carrier or sector, for example.

At 706, a first set of beacon symbols can be decoded to determine information about the transmitter of the symbol. As described, this information can include an identifier for the transmitter and/or communication specifications; the information can also or alternatively include specifications regarding other beacon symbols, where the beacon can be comprised of one or more patterns of symbols. At 708, a second set of second beacon symbols can be decoded to determine information about the transmitter. It is to be appreciated that the transmitter of the first and second symbols sets can be different or the same transmitters. In this regard, additional information can be comprised within the second beacon symbol, which can relate to the transmitter and/or regarding other beacon symbols from the transmitter, for example. Moreover, the steps 706 and 708, or substantially any of the steps shown can execute in serial or in parallel.

It will be appreciated that, in accordance with one or more aspects described herein, inferences can be made regarding selecting or determining a symbol period and/or subcarrier on which to send one or more beacon symbols as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting one or more symbol periods or subcarriers for transmitting beacon symbols. By way of further illustration, an inference can be made with regard to information gathered about other entities transmitting beacon symbols (where acquired by the inferring entity or other entities moving about the transmission area). It will be appreciated that the foregoing examples are illustrative in nature and are not intended to limit the number of inferences that can be made or the manner in which such inferences are made in conjunction with the various embodiments and/or methods described herein.

Figure 8:
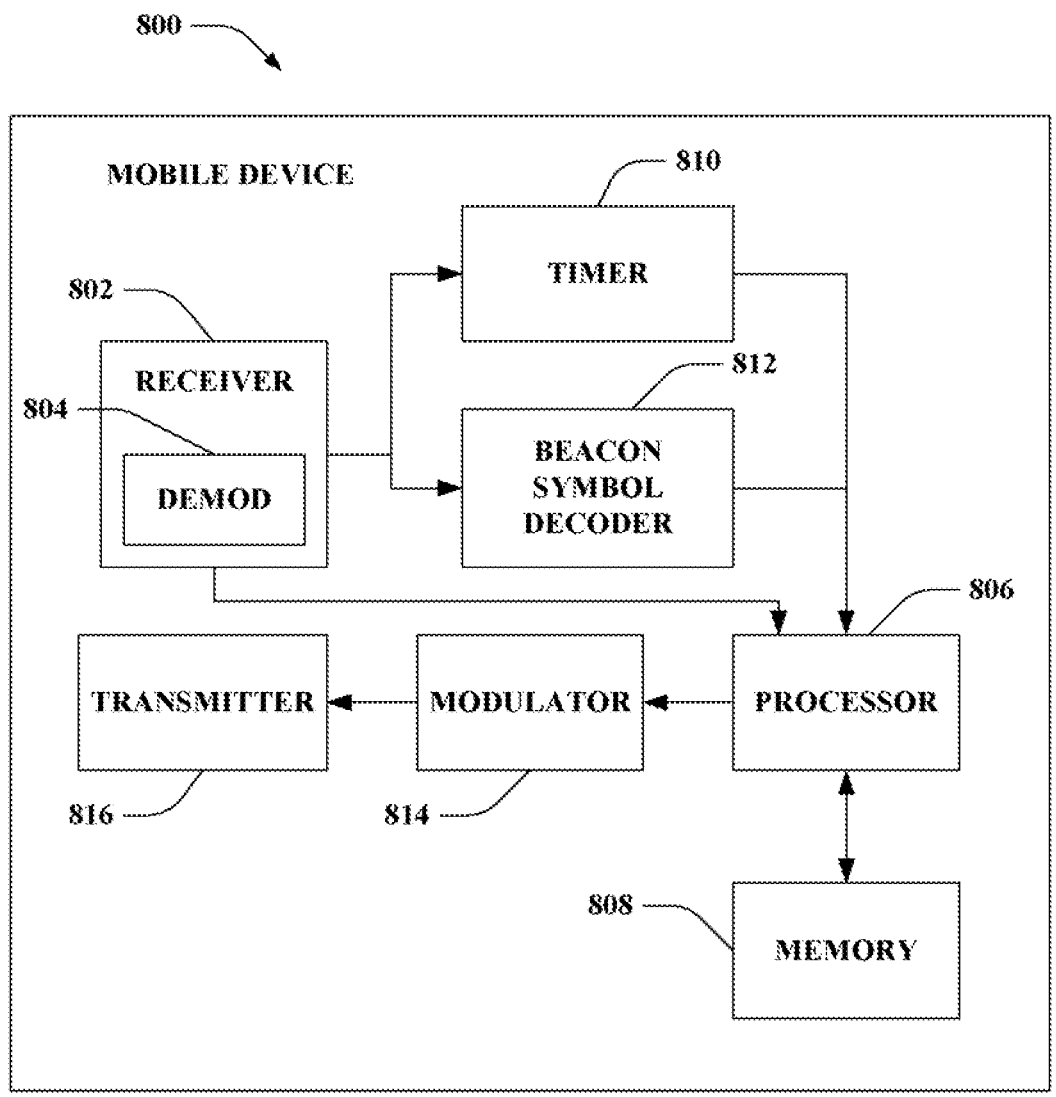
FIG. 8 is an illustration of an example mobile device that facilitates receiving beacon symbols broadcast at different times in a superframe.

FIG. 8 is an illustration of a mobile device 800 that facilitates receiving beacon symbols in a plurality of time slots and/or on a plurality of subcarriers (e.g. for a superframe in an OFDM communication network). Mobile device 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of mobile device 800, and/or a processor that both analyzes information received by receiver 802, generates information for transmission by transmitter 816, and controls one or more components of mobile device 800.

Mobile device 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 808 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Receiver 802 is further operatively coupled to a timer 810 that can facilitate communicating in a synchronous communication configuration such that timing can be a factor in evaluating transmissions received by the receiver 802, for example. According to an example, a transmission can be classified based in part on the time slot or symbol period on which it is sent (e.g. a beacon symbol as described herein). Additionally, a beacon symbol decoder 812 can utilize the timer 810 to determine if a received symbol is a beacon symbol, whether a single symbol or part of a code or pattern. According to one example, the beacon symbol decoder 812 can identify a beacon symbol following demodulation by the demod 804 as well. Accordingly, the receiver 802 can receive one or more beacon symbols on a plurality of subcarriers across a plurality of symbol periods and leverage the beacon symbol decoder 812 to gather information from the beacon symbol (such as a sector identifier, a period for the beacon, the number of symbols in a beacon code, and substantially any information regarding the beacon symbol or the transmitter thereof), for example. Because the beacon symbol decoder 812 can decode beacon symbols received regardless of the time slot received in, transmitters can broadcast beacon symbols in a plurality of time slots to avoid collision therebetween. To this end, the timer 810 can also help interpret the beacon symbols and determine when other symbols can be expected, for example. Mobile device 800 still further comprises a modulator 814 and a transmitter 816 that can transmits a communication signal to, for instance, a base station, another mobile device, etc. As described previously, in one example, the mobile device 800 can receive and provide beacon symbol information from one or more beacon symbol transmitters to one or more other beacon symbol transmitters to facilitate effective beacon symbol time shifting as described supra. Although depicted as being separate from the processor 806, it is to be appreciated that timer 810, beacon symbol decoder 812 and/or modulator 814 can be part of processor 806 or a number of processors (not shown).

Figure 9:
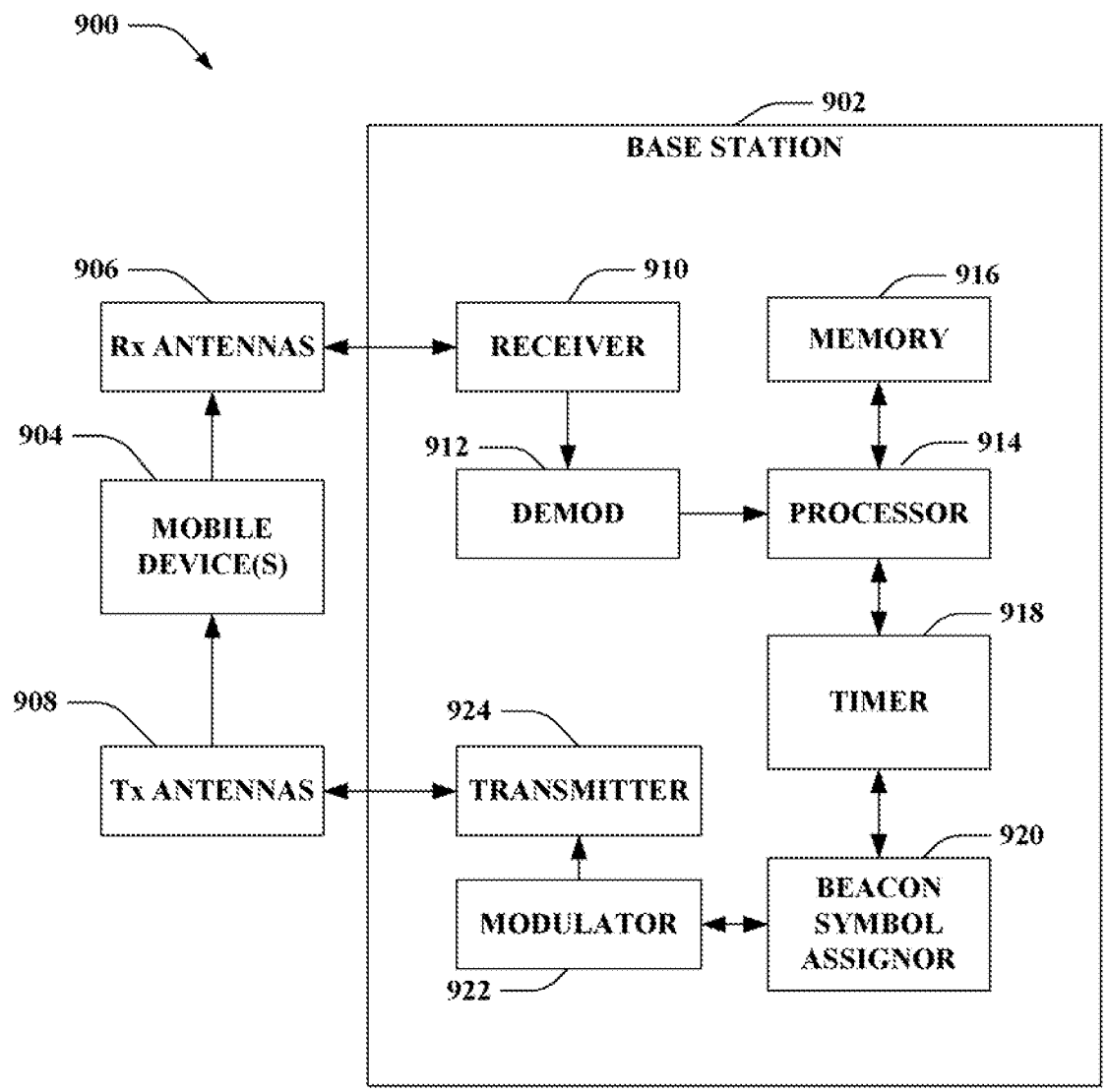
FIG. 9 is an illustration of an example system that facilitates broadcasting beacon symbols in various symbol periods.

FIG. 9 is an illustration of a system 900 that facilitates transmitting one or more beacon symbols in different time slots or symbol periods and/or different subcarriers thereof. For example, the system 900 can operate in an OFDM communication network where beacon symbols can be sent in different symbol periods of a superframe using one or substantially one subcarrier. The system 900 comprises a base station 902 (e.g., access point, . . . ) with a receiver 910 that receives signal(s) from one or more mobile devices 904 (and a demod 912 that can demodulate such signals) through a plurality of receive antennas 906, and a transmitter 924 that transmits to the one or more mobile devices 904 through a transmit antenna 908. The transmitter 924 can transmit one or more beacon symbols related to the base station 902, for example. The beacon symbol can identify information regarding the base station 902 and/or one or more sectors thereof. For example, the beacon symbol can serve to identify the base station 902 and/or sector; additionally, the beacon symbol can be part of an overriding beacon that spans a plurality of beacon symbols in one example. The beacon symbol can be modulated to a frequency domain by the modulator 922 and transmitted by one or more transmitter antennas 908 using the transmitter 924, for instance.

For example, the base station can leverage a beacon symbol assignor 920, as described herein, to select (and/or determine, such as based on inference as described supra) one or more symbol periods and/or subcarriers for transmitting a beacon symbol. In so doing, the base station 902 can participate in a network having many transmitting sectors in range of a device at a given time with only a limited number of bandwidth; by allowing the beacon symbols to be transmitted on different symbol periods in a superframe thus increasing the number of possible beacon symbol transmission slots exponentially to the number of subcarriers. In one example, the timer 918 can help facilitate this functionality by allowing the base station 902 to send out the beacon symbols in the selected time period in a synchronous communication network. It is to be appreciated that the timer 918 and beacon symbol assignor 920 can be leveraged by the processor 914 to effectuate this functionality. Additionally or alternatively, some or all of the timer 918 and beacon symbol assignor 920 can reside in, or be implemented by, the processor 914. Furthermore, the memory 916 can comprise instructions to facilitate the foregoing functionality. Moreover, the memory 916 can comprise information regarding the symbol periods and/or subcarriers to use in transmitting the beacon symbols as well. As described, this can be derived from various sources, such as network planning, other devices, inferred from behavior or information of past uses or other devices, for example.

Figure 10:
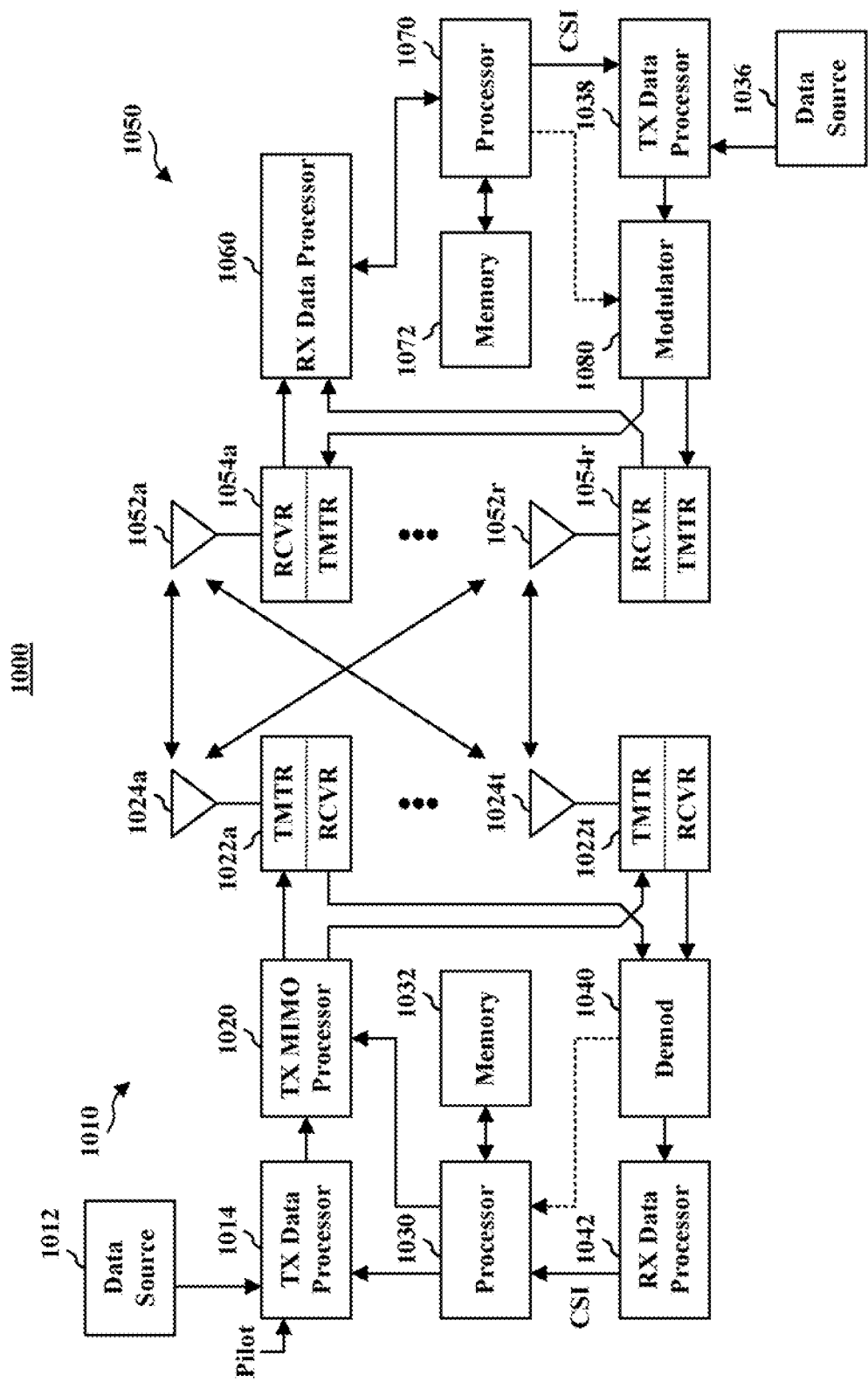
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-3 and 8-9), techniques/configurations (FIGS. 4-5) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by NR antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
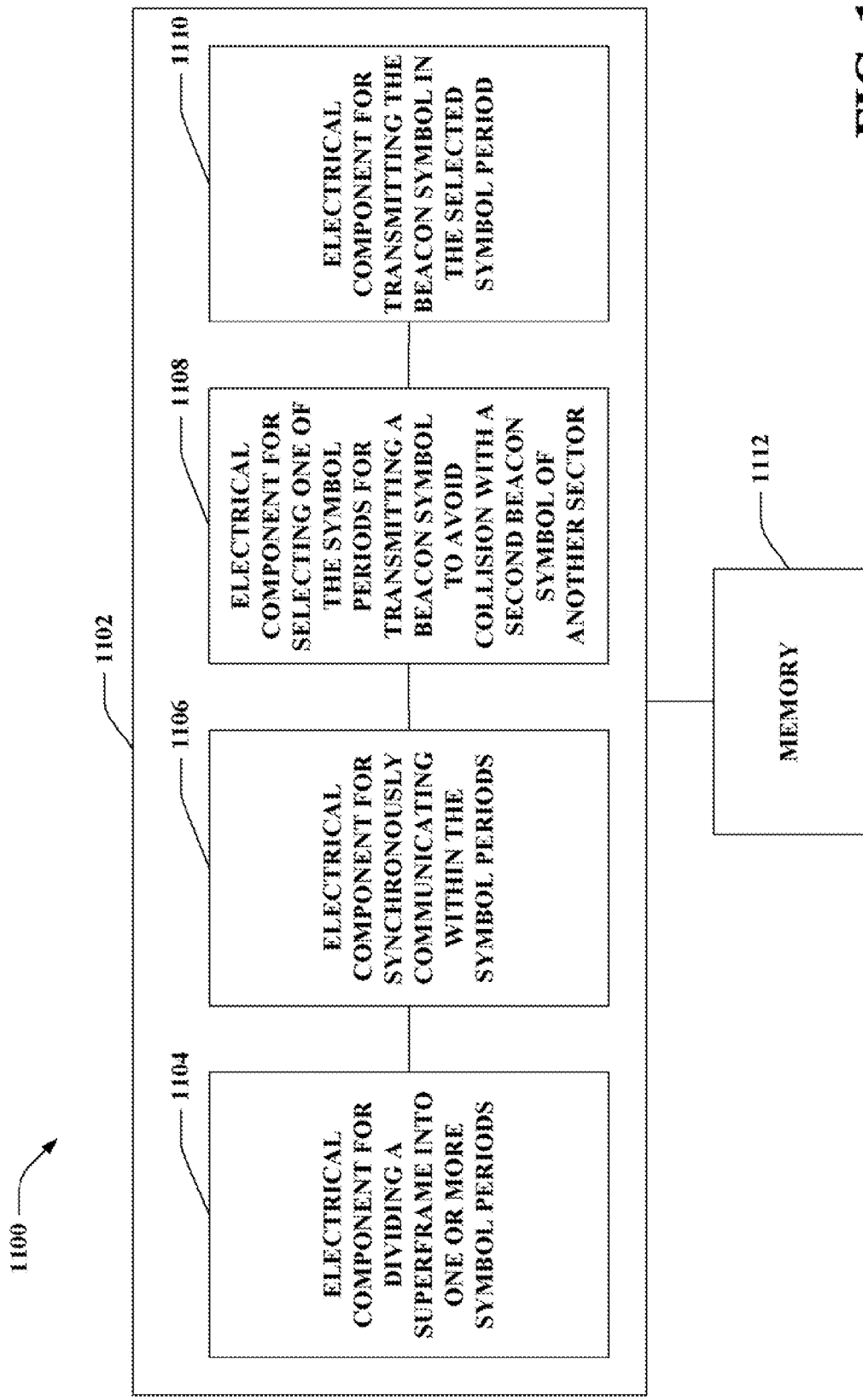
FIG. 11 is an illustration of an example system that transmits beacon symbols using multiple symbol periods of a superframe.

With reference to FIG. 11, illustrated is a system 1100 that broadcasts beacon symbols in different symbol periods of a synchronous wireless communication system. For example, system 1100 can reside at least partially within a base station It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for dividing a superframe (e.g. in an OFDM communications configuration) into one or more symbol periods 1104. For example, the symbol periods can be utilized to add a time factor to wireless communications; accordingly, devices can be synchronized using the time for purposes such as identifying data sent and/or a source thereof, for example. Further, logical grouping 1102 can comprise an electrical component for synchronously communicating within the symbol periods 1106. As described supra, this can be a timer or another type of clock that can allow devices in the network to send and receive data according to time, for example. Moreover, logical grouping 1102 can include an electrical component for selecting one of the symbol periods for transmitting a beacon symbol to avoid collision with a second beacon symbol of another sector 1108. According to an example, the system 1100 can receive information related to a symbol period to utilize in sending a beacon symbol to mitigate collisions with other sectors; as described previously, this information can come from network planning, received from other devices, discerned by the system 1100 based on other received information, and the like. Furthermore, logical grouping 1102 can comprise an electrical component for transmitting the beacon symbol in the selected period 1110. In this regard, collisions can be avoided as shown. Additionally, system 1100 can include a memory 1112 that retains instructions for executing functions associated with electrical components 1104, 1106, 1108, and 1110. While shown as being external to memory 1112, it is to be understood that one or more of electrical components 1104, 1106, 1108, and 1110 can exist within memory 1112.

Figure 12:
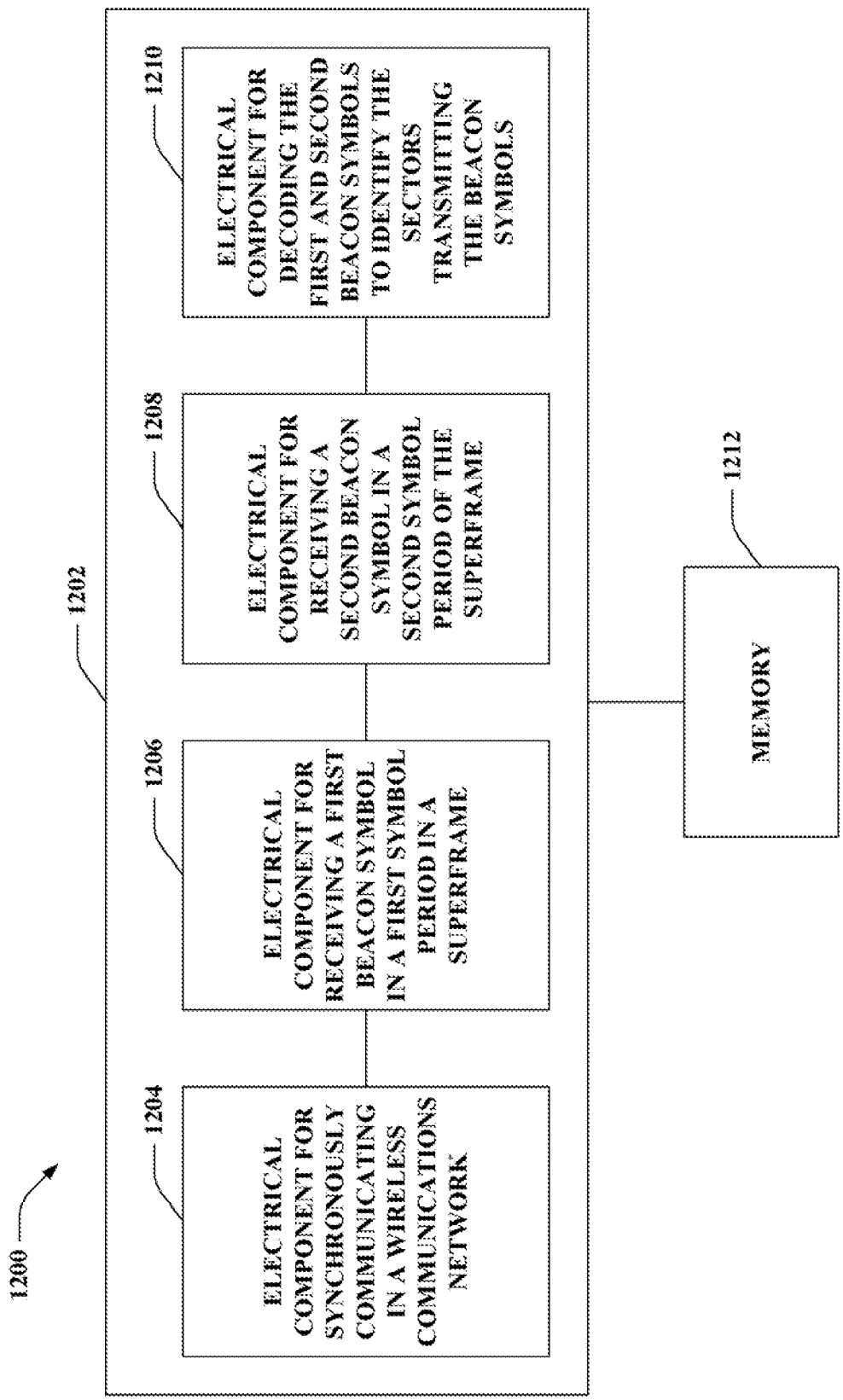
FIG. 12 is an illustration of an example system that receives a plurality of beacon symbols sent at different time periods of a superframe.

Turning to FIG. 12, illustrated is a system 1200 that receives a plurality of beacon symbols transmitted in different time periods. System 1200 can reside within a mobile device, for instance. As depicted, system 1200 includes functional blocks that can represent functions implemented by a processor, software, or combination thereof (e.g., firmware). System 1200 includes a logical grouping 1202 of electrical components that facilitate receiving and decoding the beacon symbols. Logical grouping 1202 can include an electrical component for synchronously communicating in a wireless communications network 1204. For example, as described with reference to the previous figure, the system 1200 can operate in a synchronous communication configuration where transmissions can occur in different discernable time periods. This information can be used to develop further information with regard to transmission. Moreover, logical grouping 1202 can include an electrical component for receiving a first beacon symbol in a first symbol time period in a superframe 1206. As available bandwidth can be broken up by time, the symbol periods can be used to transmit information; the beacon symbol can be sent on one or more available symbol periods in the superframe. It is to be appreciated that some of the other symbol periods can be used to transmit other data, such as communication data. Further, logical grouping 1202 can comprise an electrical component for receiving a second beacon symbol in a second symbol period of the superframe 1208. In this regard, multiple symbol periods of a superframe can be used for transmitting beacon symbols, thus mitigating collisions between transmitting sectors. Also, logical grouping 1202 can include an electrical component for decoding the first and second beacon symbols to identify the sectors transmitting the beacon symbols 1210. For example, the beacon symbols can comprise information regarding the sectors such as identification and/or preferred carrier information. Also, a beacon symbol can be part of an entire beacon pattern that comprises such information in one example. Additionally, system 1200 can include a memory 1212 that retains instructions for executing functions associated with electrical components 1204, 1206, 1208, and 1210. While shown as being external to memory 1212, it is to be understood that electrical components 1204, 1206, 1208, and 1210 can exist within memory 1212.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of transmitting beacon symbols in different symbol periods or time slots of a superframe in an OFDM configuration and on the same or different subcarriers to mitigate collision with beacon symbols from other sectors and grow the number of available independent channels for beacon symbol transmissions as a factor of the additional available symbol periods, comprising:

determining one or more symbol periods for sending one or more beacon symbols in different symbol periods of a superframe and on different subcarriers to reduce or avoid collision with one or more disparate beacon symbols from a disparate source, the one or more symbol periods being determined from a subset of symbol periods useable for transmitting beacon symbols; and growing the number of available independent channels for beacon symbol transmissions as a factor of the additional available symbol periods by sending the one or more beacon symbols in the one or more determined symbol periods.

2. The method of claim 1, the one or more beacon symbols and the one or more disparate beacon symbols are sent by one or more base stations or one or more sectors thereof.

3. The method of claim 1, further comprising: determining one or more subcarriers in the one or more symbol periods for sending the one or more beacon symbols; and sending the one or more beacon symbols on the one or more subcarriers.

4. The method of claim 3, wherein at least one of the one or more subcarriers is determined for the one or more symbol periods using a maximum distance separable (MDS) code.

5. The method of claim 3, wherein the one or more beacon symbols are chosen based at least in part on a identifier of a source of the one or more beacon symbols.

6. The method of claim 1, further comprising encoding a sector identifier into a beacon code, the one or more beacon symbols being at least one symbol of the beacon code.

7. The method of claim 1, wherein the one or more symbol periods are determined based at least in part on a predetermined network planning configuration.

8. The method of claim 1, wherein the one or more symbol periods are determined based at least in part on beacon symbol timing information received regarding other sectors.

9. The method of claim 8, wherein the beacon symbol timing information is received by a mobile device.

10. The method of claim 8, wherein the one or more symbol periods are determined pseudo-randomly based on the received beacon symbol timing information.

11. A wireless communications apparatus that transmits one or more beacon symbols in different symbol periods or time slots of a superframe in an OFDM configuration and on the same or different subcarriers to mitigate collisions with beacon symbols from other sectors and grow the number of available independent channels for beacon symbol transmissions as a factor of the additional available symbol periods, comprising:
　at least one processor configured to select at least one symbol period and/or a subcarrier in a superframe in an OFDM configuration for transmitting a beacon symbol; and
　a memory coupled to the at least one processor.

12. The wireless communications apparatus of claim 11, wherein the at least one processor is further configured to transmit beacon symbols.

13. The wireless communications apparatus of claim 11, wherein the at least one of the symbol period or the subcarrier is selected based on information regarding other wireless communications apparatuses sending beacon symbols.

14. The wireless communications apparatus of claim 13, wherein the information is received in communication with one or more mobile devices.

15. The wireless communications apparatus of claim 11, wherein the symbol period and/or the subcarrier are chosen based at least in part on an identifier related to the wireless communications apparatus.

16. The wireless communications apparatus of claim 11, wherein a plurality of symbol periods and/or subcarriers are selected in a single superframe.

17. A wireless communications apparatus that transmits one or more beacon symbols during different symbol periods or time slots of a superframe in an OFDM configuration and on the same or different subcarriers to mitigate collisions with beacon symbols from other sectors to grow the number of available independent channels for beacon symbol transmissions as a factor of the additional available symbol periods, comprising:
　means for dividing a superframe into one or more symbol periods;
　means for synchronously communicating within the symbol periods; means for selecting one of the symbol periods for transmitting a beacon symbol to avoid collision with a second beacon symbol of another sector; and means for transmitting the beacon symbol in the selected symbol period.

18. The wireless communications apparatus of claim 17, further comprising means for selecting a subcarrier of the superframe for transmitting the beacon symbol to avoid collision with the second beacon symbol.

19. The wireless communications apparatus of claim 18, wherein the subcarrier is selected using a maximum distance separable (MDS) code.

20. The wireless communications apparatus of claim 17, further comprising means for receiving information regarding the second beacon symbol.

21. The wireless communications apparatus of claim 17, wherein at least one of the beacon symbol or the one or more symbol periods are chosen based at least in part on a identifier of a source of the beacon symbol.

22. The wireless communications apparatus of claim 17, wherein the one or more symbol periods are selected based at least in part on a predetermined network planning configuration.

23. The wireless communications apparatus of claim 17, wherein the one or more symbol periods are selected based at least in part on beacon symbol timing information received regarding other sectors.

24. The wireless communications apparatus of claim 23, wherein the beacon symbol timing information is received by a mobile device.

25. The wireless communications apparatus of claim 23, wherein the one or more symbol periods are determined pseudo-randomly based on the received beacon symbol timing information.

26. A computer program product, comprising:
　a non-transitory computer-readable medium comprising:
　code for causing at least one computer to determine a symbol period for sending a beacon symbol in different symbol periods or time slots of a superframe in an OFDM configuration and on different subcarriers and to reduce or avoid collision with a second beacon symbol from a disparate source, the symbol period being determined from a subset of symbol periods useable for transmitting beacon symbols; and
　code for causing the at least one computer to send the beacon symbol in the determined symbol period.

27. The computer program product of claim 26, the computer-readable medium further comprising:
　code for causing the at least one computer to determine a subcarrier in the symbol period for sending the beacon symbol; and
　code for causing the at least one computer to send the beacon symbol on the subcarrier.

28. A wireless communication apparatus that transmits one or more beacon symbols in different symbol periods or time slots of a superframe in an OFDM configuration and on the same or different subcarriers to mitigate collisions with beacon symbols from other sectors and grow the number of available independent channels for beacon symbol transmissions as a factor of the additional available symbol periods, comprising:
　a processor configured to: divide a superframe into one or more symbol periods;
　synchronously communicate within the symbol periods;

select one of the symbol periods for transmitting a beacon symbol to avoid collision with a second beacon symbol of another sector; and transmit the beacon symbol in the selected symbol period; and a memory coupled to the processor.

29. A method of receiving beacon symbols at multiple symbol periods or time slots of a superframe in an OFDM configuration and on the same or different subcarriers to mitigate collision with beacon symbols from other sectors and grow the number of available independent channels for beacon symbol transmissions as a factor of the additional available symbol periods, comprising:

receiving beacon symbols from a plurality of transmitters, the beacon symbols being sent in a symbol period selected to reduce collision with the other transmitters; and decoding the received beacon symbols to obtain information comprised in the beacon symbols.

30. The method of claim 29, wherein the transmitters relate to one or more sectors of one or more base stations in a wireless communications network.

31. The method of claim 30, further comprising transmitting beacon symbol information to the sectors regarding other sectors such that the other sectors can utilize the beacon symbol information in selecting symbol periods for the beacon symbols.

32. The method of claim 29, wherein the obtained information relates to one or more transmitter identifiers.

33. The method of claim 32, wherein at least one transmitter is a sector and the obtained information further comprises an index of a preferred carrier of the sector.

34. The method of claim 29, further comprising utilizing a timer to associate synchronous timing with the beacon symbols to determine a pattern or periodicity of the beacon symbols.

35. The method of claim 29, wherein the symbol periods of the beacon symbols are pseudo-random with respect to at least one other symbol period of a disparate beacon symbol.

36. A wireless communications apparatus that transmits one or more beacon symbols in different symbol periods or time slots of a superframe in an OFDM configuration and on the same or different subcarriers to mitigate collisions with beacon symbols from other sectors and grow the number of available independent channels for beacon symbol transmissions as a factor of the additional available symbol periods, comprising:

at least one processor configured to receive and decode a plurality of beacon symbols sent from one or more sectors during different symbol periods in a synchronous wireless communications network; and a memory coupled to the at least one processor.

37. The wireless communications apparatus of claim 36, wherein the at least one processor is further configured to use beacon code information to decode the beacon symbols to obtain additional information regarding the beacon symbols.

38. The wireless communications apparatus of claim 36, wherein the at least one processor is further configured to decode the plurality of beacon symbols yields at least one identifier for the one or more sectors.

39. The wireless communications apparatus of claim 36, wherein the at least one processor is further configured to transmit beacon symbol information to the sectors regarding other sectors such that the other sectors can utilize the beacon symbol information in selecting symbol periods for the beacon symbols.

40. The wireless communications apparatus of claim 36, wherein the at least one processor is further configured to utilize a timer to associate synchronous timing with the plurality of beacon symbols to determine a pattern or periodicity of the beacon symbols.

41. The wireless communications apparatus of claim 36, wherein symbol periods of the beacon symbols are pseudo-random with respect to at least one other symbol period of a disparate beacon symbol.

42. A wireless communications apparatus for receiving beacon symbols at multiple symbol periods or time slots of a superframe in an OFDM configuration and on the same or different subcarriers to mitigate collisions with beacon symbols from other sectors and grow the number of available independent channels for beacon symbol transmissions as a factor of the additional available symbol periods, comprising:

means for synchronously communicating in a wireless communications network;

means for receiving a first beacon symbol in a first symbol period in a superframe;

means for receiving a second beacon symbol in a second symbol period of the superframe; and means for decoding the first and second beacon symbols to identify one or more sectors transmitting the beacon symbols.

43. The wireless communications apparatus of claim 42, the decoding of the first and second beacon symbols performed asynchronously.

44. The wireless communications apparatus of claim 42, further comprising means for transmitting beacon symbol information to the one or more sectors regarding other sectors such that the one or more sectors can utilize the beacon symbol information in selecting symbol periods for beacon symbols.

45. The wireless communications apparatus of claim 42, further comprising means for decoding the first and second beacon symbols to identify an index of one or more preferred carrier of the one or more sectors.

46. The wireless communications apparatus of claim 42, further comprising means for utilizing a timer to associate synchronous timing with the first and second beacon symbol to determine a pattern or periodicity of the first and second beacon symbol.

47. The wireless communications apparatus of claim 42, wherein the first symbol period is pseudo-random with respect to the second symbol period.

48. A computer program product, comprising:

a non-transitory computer-readable medium comprising: code for causing at least one computer to receive beacon symbols from a plurality of transmitters, the beacon symbols being sent in a symbol in different symbol periods or time slots of a superframe in OFDM configuration and on different subcarriers to reduce collision with the other transmitters; and code for causing the at least one computer to decode the received beacon symbols to obtain information comprised in the beacon symbols.

49. The computer program product of claim 48, wherein at least one transmitter is a sector and the obtained information further comprises an index of a preferred carrier of the sector.

50. A wireless communication apparatus that transmits one or more beacon symbols in different symbol periods or time slots of a superframe in OFDM configuration and on the same or different subcarriers to mitigate collisions with beacon symbols from other sectors and grow the number of available independent channels for beacon symbol transmissions as a factor of the additional available symbol periods, comprising:

a processor configured to:

synchronously communicate in a wireless communications network;

receive a first beacon symbol in a first symbol period in a superframe;
receive a second beacon symbol in a second symbol period of the superframe; and
decode the first and second beacon symbols to identify one or more sectors transmitting the beacon symbols; and a memory coupled to the processor.

* * * * *